United States Patent [19]

Berrong et al.

[11] Patent Number: 5,517,862

[45] Date of Patent: May 21, 1996

[54] APPARATUS AND METHOD FOR MEASURING VENTILATION FLOW EXITING A SPINNING ROTOR

[75] Inventors: David B. Berrong; Walter R. Laster, both of Oviedo, Fla.; George W. Sanford, Charlotte, N.C.; R. Michael Roidt, North Versailes, Pa.; Richard A. Evans, Pittsburgh, Pa.; Roy E. Wootton, Murrysville, Pa.

[73] Assignee: Westinghouse Electric Corporation, Pittsburgh, Pa.

[21] Appl. No.: 384,172

[22] Filed: Feb. 6, 1995

[51] Int. Cl.⁶ .................................................. G01P 5/06
[52] U.S. Cl. ............................. 73/861.85; 73/861.87
[58] Field of Search ........................... 73/861.85, 170.08, 73/170.11, 861.79, 204.26, 204.21, 204.11, 204.16, 861.87

[56] References Cited

U.S. PATENT DOCUMENTS

| | | | |
|---|---|---|---|
| 4,011,752 | 3/1977 | Fowler | 73/170.08 |
| 4,155,252 | 5/1979 | Morrill | 73/170.08 |
| 4,911,008 | 3/1990 | Casey | 73/204.21 |
| 5,237,867 | 8/1993 | Cook, Jr. | 73/204.26 |

*Primary Examiner*—Richard Chilcot
*Assistant Examiner*—Max H. Noori

[57] ABSTRACT

An apparatus and method for measuring discrete velocities of exhaust flows coming out of individual circumferential rotor body vent holes while a rotor is running at operating speed. The apparatus and method employs a hot film anemometer to measure flow distributions around the rotor shaft, i.e., circumferential flow distributions.

25 Claims, 7 Drawing Sheets

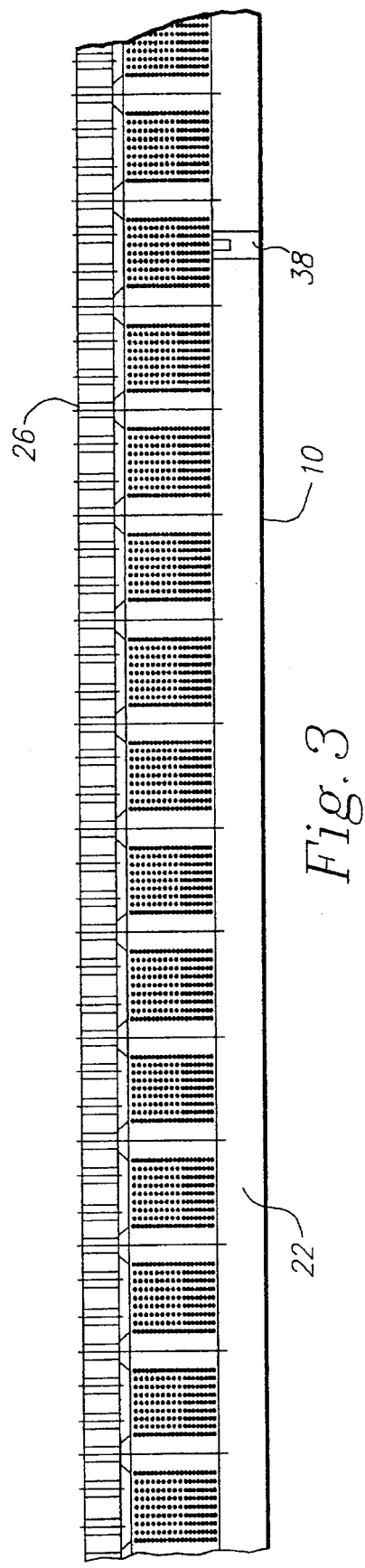
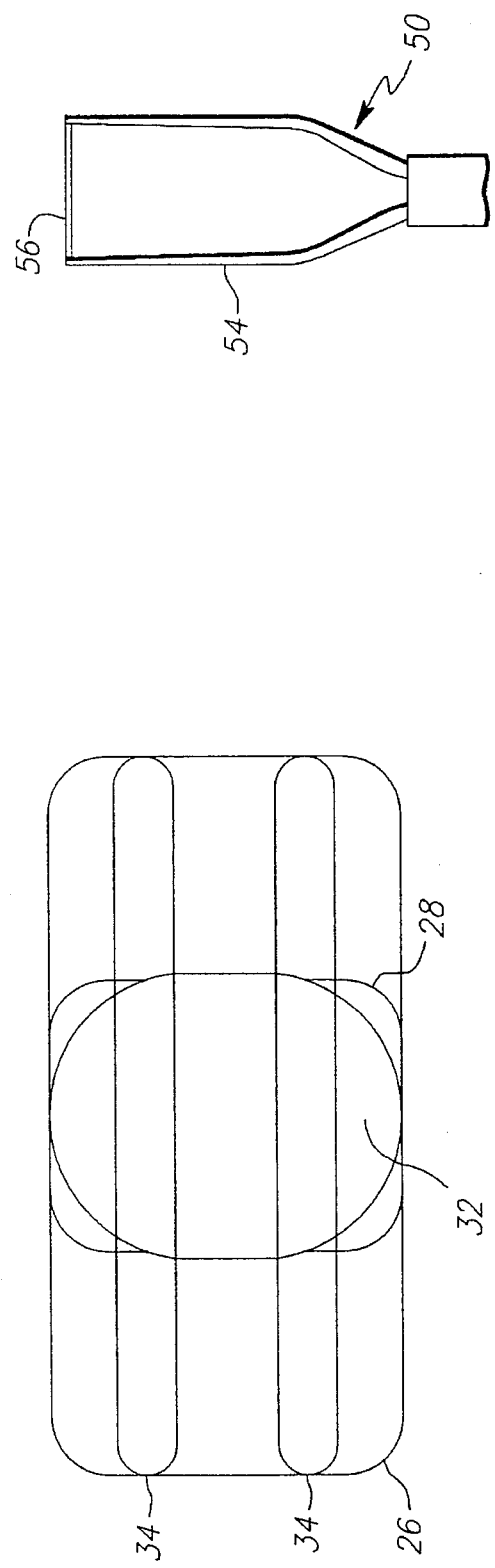
Fig. 3
Fig. 4
Fig. 5

APPARATUS AND METHOD FOR MEASURING VENTILATION FLOW EXITING A SPINNING ROTOR

FIELD OF THE INVENTION

The present invention relates to an apparatus for measuring the flow exiting a rotor, and in particular, to an apparatus for measuring the circumferential flow exiting an air-cooled turbine rotor.

BACKGROUND OF THE INVENTION

The fluid dynamics and heat transfer phenomena acting on a generator rotor while operating at running speed are critical to the performance of a generator, in particular, air cooled rotors. The fluid dynamics and heat transfer phenomena, however, are by their nature exceedingly complex. For this reason, it has been a major engineering challenge to accurately calculate and predict rotor field winding operating temperatures. The determination and control of rotor field winding operating temperatures are crucial to generator efficiency and insulation system integrity.

Historically, most rotor designs have incorporated a conservative rating versus cooling capacity. This was necessary, in part, because of the uncertainties related to ventilation and operating temperatures of rotors. New lines of air-cooled rotors, however, are designed with very little margin between predicted operating temperatures and the maximum temperature allowable for efficient operation. As a consequence, it has become necessary to perform extensive ventilation flow development testing on both actual rotors and laboratory models to effectively design rotor ventilation systems.

The results of such testing are used in the design and calibration of rotor ventilation systems. A new, very powerful analytical technique known as Computational Fluid Dynamics ("CFD") is also used in the testing process. CFD modeling is an effective tool for calculating expected flows in complex systems, such as generator rotors. The testing and CFD modeling is particularly useful for verifying that ventilation systems in prototype rotors function as they are intended to by design and for confirming the integrity of the manufacturing processes used in fabricating these systems.

As a consequence, obtaining accurate measurements of flow parameters which influence the efficiency of heat dissipation in the rotor field windings is the chief objective of ventilation flow development testing of rotors. Key flow parameters include: the total overall volume of flow being pumped through the rotor, the pressure and velocity associated with this flow, and the distribution of this flow in the rotor, both along the length of the rotor body (axial), and around the rotor body shaft (circumferential). Known tests produce accurate representations of the axial flow distribution in a rotor, but they provide no information of the circumferential distribution of the flow. Thus, a need exists for a testing method and apparatus which can obtain an accurate measurement of circumferential flow distributions in a rotor.

SUMMARY OF THE INVENTION

It is an objective of the invention to provide a testing apparatus and a testing method for measuring discrete velocities of exhaust flows coming out of individual rotor body vent holes while a rotor is running at operating speed. In particular, it is an object to measure flow distributions around the rotor shaft, i.e., circumferential flow distributions.

In one embodiment, the invention is an apparatus for measuring a velocity of flow exiting a circumferential vent of an air-cooled rotor running at operating speed where the vent forms a circumferential path about the axis of rotation of the rotor. The apparatus includes a high frequency response anemometer having a sensor. The sensor generates a signal that is representative of the flow velocity of the vent. A support structure holds the sensor of the anemometer close to the circumferential path formed by the vent about the axis of rotation of the rotor. Finally, means determine the flow velocity of the vent of the rotor from the signal generated by the sensor.

In this embodiment, the support structure orients the sensor perpendicular to the axis of rotation of the rotor and positions the sensor approximately 0.05 inches (0.13 cm) to 0.15 inches (0.38 cm) from the circumferential path formed by the vent about the axis of rotation of the rotor. In this embodiment, the anemometer is a hot-film anemometer where the hot-film anemometer includes a nickel film deposited on a quartz fiber.

In another embodiment, the invention is an apparatus for measuring a velocity of flow exiting a first and a second circumferential vent of an air-cooled rotor running at operating speed. The first circumferential vent forms a first circumferential path about the axis of rotation of the rotor. The second circumferential vent forms a second circumferential path about the axis of rotation of the rotor. The apparatus includes a high frequency response anemometer having a sensor. The sensor generates a signal that is representative of the flow velocity of the vents. The apparatus also includes a support structure with a traversing table. The support structure is capable of alternatively positioning the sensor of the anemometer close to the first circumferential path formed by the first circumferential vent about the axis of rotation of the rotor and close to the second circumferential path formed by the second circumferential vent about the axis of rotation of the rotor.

Finally, means determine the flow velocity of the first circumferential vent of the rotor from the signal generated by the sensor when the support structure positions the sensor close to the first circumferential path formed by the first circumferential vent about the axis of rotation of the rotor. The means also determine the flow velocity of the second circumferential vent of the rotor from the signal generated by the sensor when the support structure positions the sensor close to the second circumferential path formed by the second circumferential vent about the axis of rotation of the rotor.

In this embodiment, the support structure orients the sensor perpendicular to the axis of rotation of the rotor and positions the sensor approximately 0.05 inches (0.13 cm) to 0.15 inches (0.38 cm) from the first circumferential path formed by the first vent about the axis of rotation of the rotor when the support structure positions the sensor close to the first circumferential path and positions the sensor approximately 0.05 inches (0.13 cm) to 0.15 inches (0.38 cm) from the second circumferential path formed by the second vent about the axis of rotation of the rotor when the support structure positions the sensor close to the second circumferential path.

In other preferred embodiments of the invention, the apparatus determines the flow velocity for a plurality of circumferential vents. In particular, in one of the other preferred embodiments, the apparatus determines the flow velocity of a plurality of circumferential vents where the plurality of circumferential vents form a circumferential path about the axis of the rotor. In another one of the other preferred embodiments, the apparatus determines the flow velocity of a first plurality of circumferential vents where the first plurality of circumferential vents form a first circumferential path about the axis of the rotor and the flow velocity of a second plurality of circumferential vents where the second plurality of circumferential vents form a second circumferential path about the axis of the rotor.

BRIEF DESCRIPTION OF THE DRAWINGS

FIG. 3 is a longitudinal cross-section view of the rotor body shown in FIG. 1.

FIG. 4 is a top view of a circumferential vent on the rotor body shown in FIG. 1.

FIG. 5 shows an exemplary hot-film anemometer.

FIG. 8b is a side view of the anemometer positioning table and support stand assembly shown in FIG. 8a.

DETAILED DESCRIPTION OF THE PREFERRED EMBODIMENTS

Figure 1:
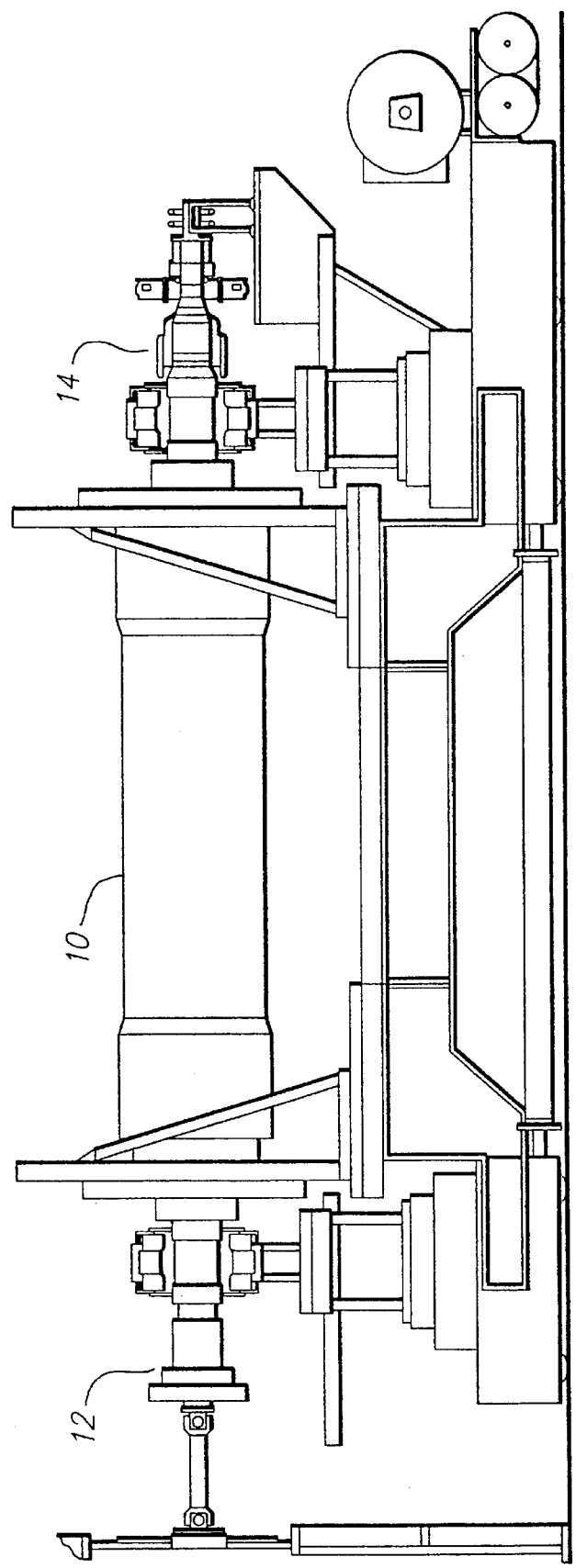
FIG. 1 is a diagram of an air cooled turbine rotor.

A preferred embodiment of the invention is presented for measuring circumferential flow distributions of a typical air cooled rotor shown and described with reference to FIGS. 1–4. FIG. 1 depicts an air cooled rotor 10 of a generator. A rotor similar to the rotor 10 shown in FIG. 1 was used to test the preferred embodiment of the invention. The rotor 10 has a turbine end 12 and an exciter end 14. The ventilation passages of the rotor 10 are shown in FIGS. 2–4.

Figure 2:
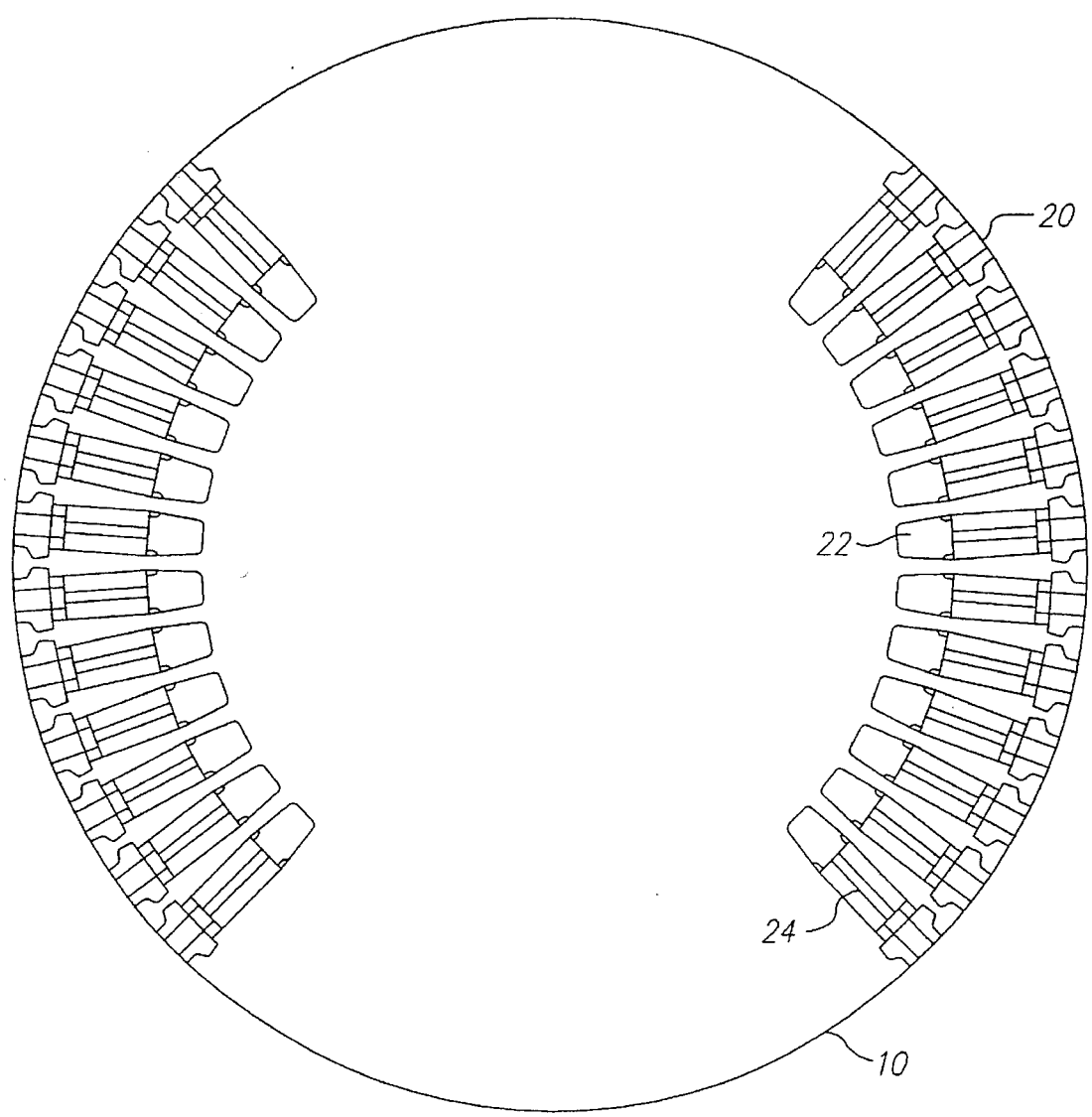
FIG. 2 is a cross-section view of the rotor body shown in FIG. 1.
Figure 6:
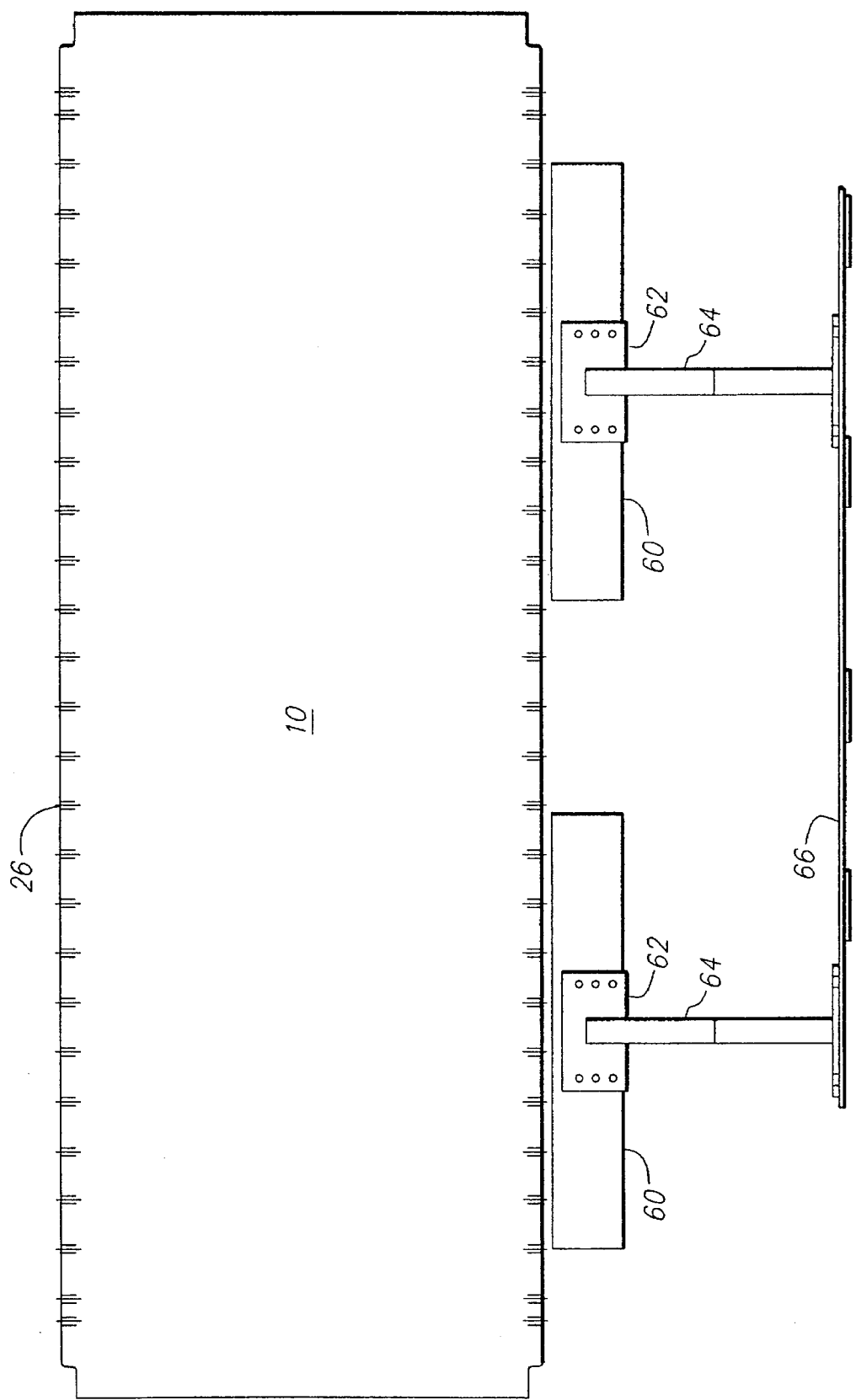
FIG. 6 is a longitudinal asymmetrical view of the a anemometer test setup according to the present invention.
Figure 7:
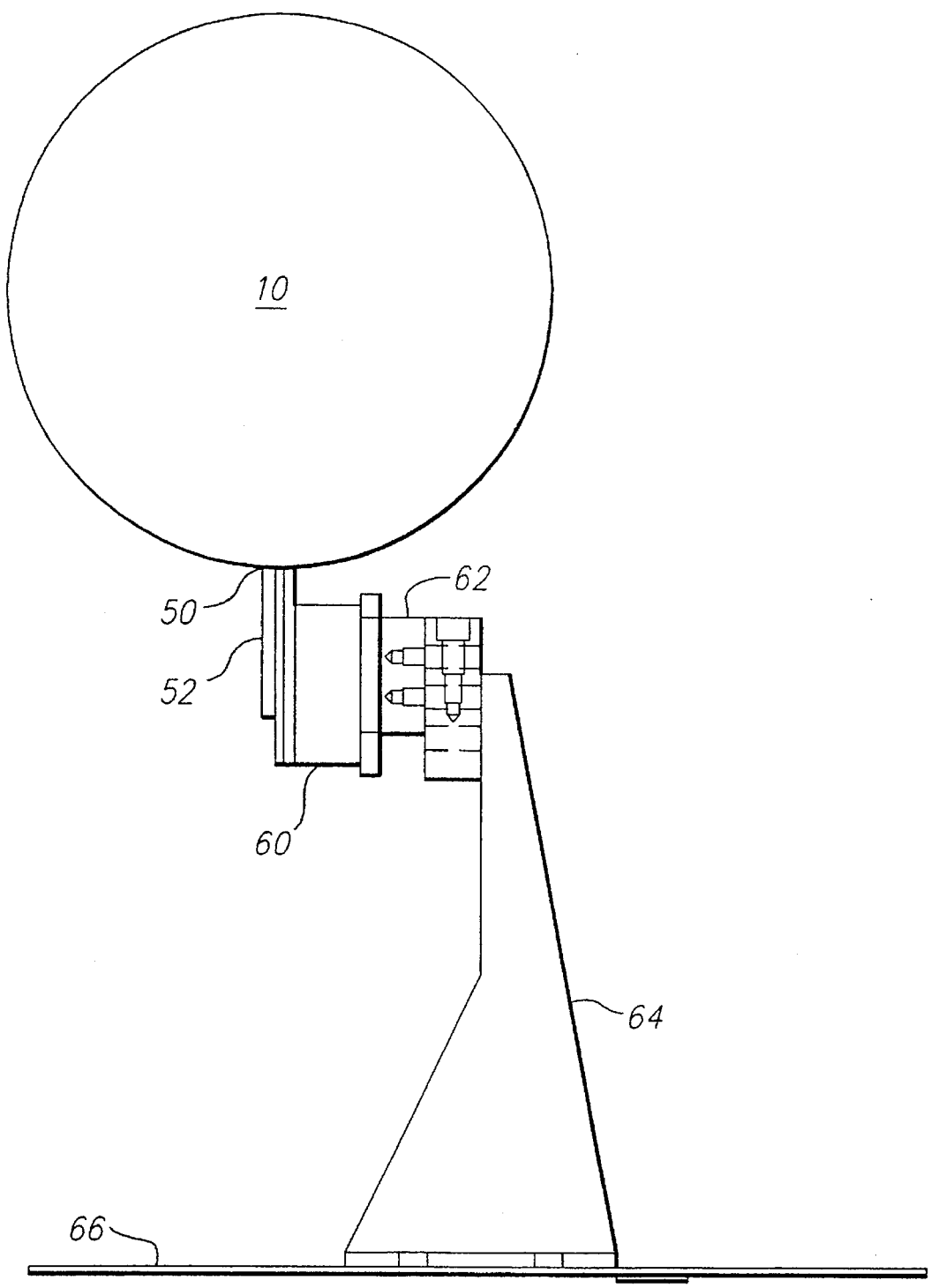
FIG. 7 is a cross-section asymmetrical view of the anemometer test setup shown in FIG. 6.
Figure 8A:
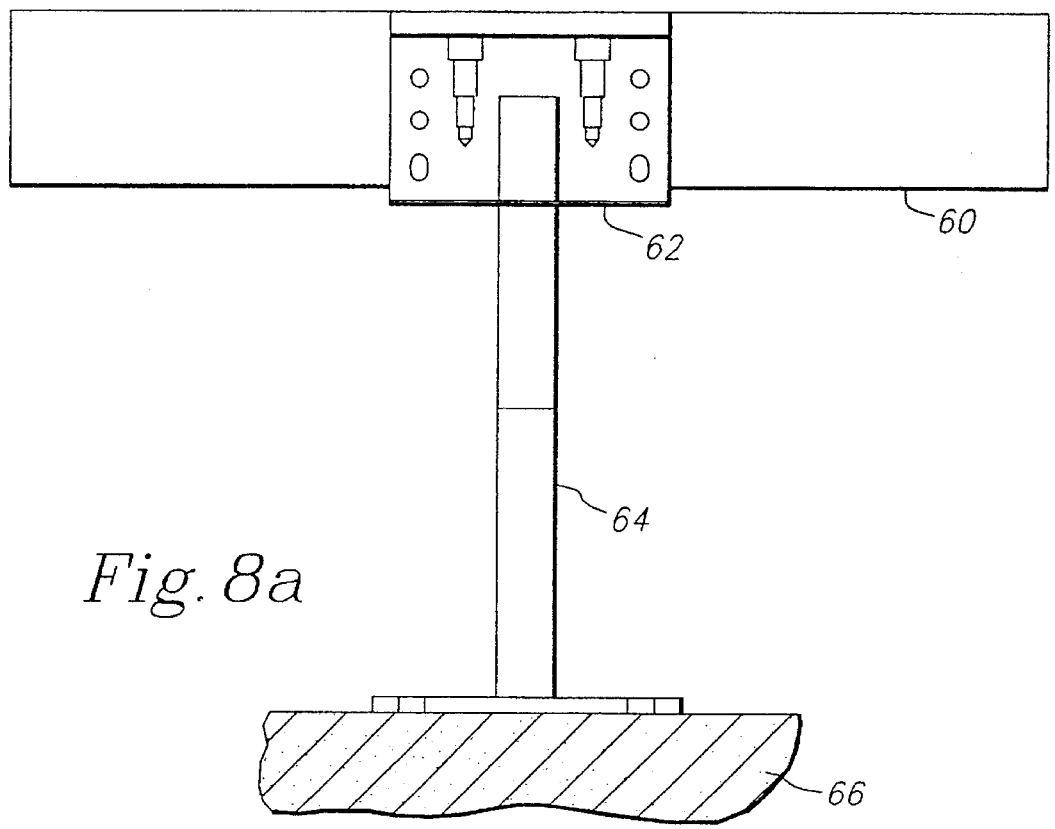
FIG. 8a is a view of an anemometer positioning table and support stand assembly shown in FIG. 6.
Figure 8B:
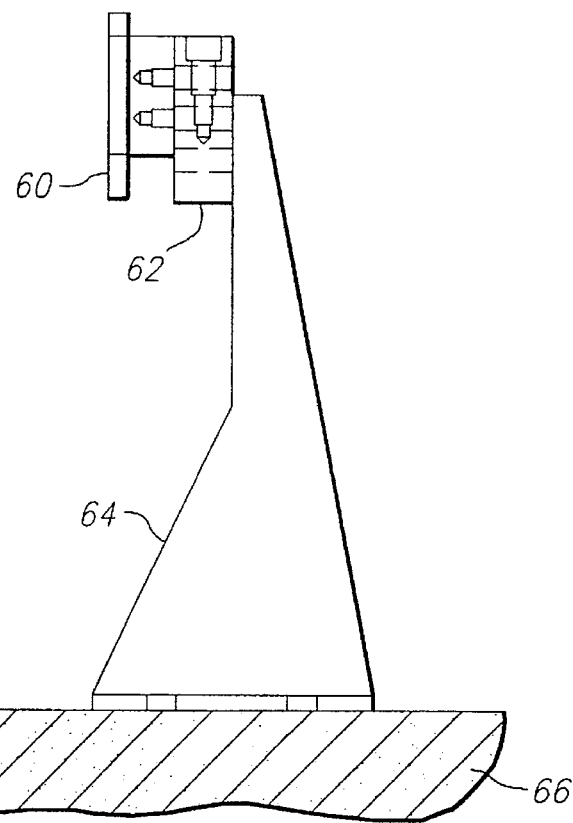

FIG. 2 shows a cross section of the rotor body. As shown in this FIGURE, the ventilation design of the rotor 10 incorporates radial-vent (circumferential vent) cooling with 24 rotor slots 20. Each rotor slot 20 has a cooling-gas passage 22, or channel, running along its bottom. There are 12 slots 20 between each pole of the rotor body 10, the slots being spaced at intervals corresponding to a total of 40 slots in the rotor 10. Air enters from each end of the slots 20 and flows axially through the rotor body 10. FIG. 3 shows a longitudinal cross section of the rotor 10. There are a total of 28 exhaust vent planes 26 (all 28 are shown in FIG. 6, for example) spaced 4 inches (10.2 cm) apart along the axial length of the rotor body 10. The air exits radially from the bottom channels 22 into a double slit in the copper straps of the field coils 24 (FIG. 2). The air carries heat away from the windings (field coils) and ultimately exhausts circumferentially from the rotor out of circumferential vent holes 20 in the slot wedges 28 at the outer diameter of the rotor body 10. There are a total of 672 (24×28) circumferential vent holes 20 on the surface of the rotor 10 through which ventilation air escapes.

FIG. 4 shows a top view of an individual circumferential vent hole 26. In the slot wedges 28, two slits 34 formed from about the copper straps combine and exit through a single oblong vent hole 32. In the generator system (not shown) for the rotor 10, flow through the rotor 10 is provided by self pumping and a single blower (not shown) located at the turbine end 12 of the rotor 10. A plug 38 (FIG. 3) is placed in each axial channel to block the flow and isolate the turbine end from the exciter end.

It has been found that by placing a pressure or flow measurement device with a very fast transient response near the body of a rotor it is possible to obtain circumferential flow distributions of the rotor from analysis of the transient data. When a rotor is spinning at 3600 revolutions per minute ("RPM"), the frequency at which the circumferential vents pass a stationary sensor is 2.4 kHz. Given a sensor with a high enough frequency response, it is possible to take readings across each of the circumferential vents.

In the preferred embodiment of the invention, a hot-film anemometer is used as a sensor. Hot-film anemometers have high frequency responses, typically 175 kHz, and are commercially available. In the rotor 10, an anemometer monitors a set of 24 circumferential vents (out of 28 sets). To monitor a particular set of vents, the anemometer is aligned with a circumferential path formed by the rotation of a set of 24 vents about the axis of the rotor (when the rotor is running), i.e., the outer diameter of the rotor 10. Due to the high frequency response of the anemometer, it is possible to obtain up to 23 readings across each of the 24 circumferential vents on any circumferential path of the rotor. In addition, flow velocity exiting a vent can be measured directly with a hot-film anemometer. An example of an exemplary hot-film anemometer used in the present invention is presented with reference to FIG. 5.

The probe 50 shown in FIG. 5 is a Dantec™ fiber-film sensor that is used in conjunction with a Dantec™ 56COI, a general-purpose, high-precision anemometer signal conditioner/processor. FIG. 5 depicts the sensor 54 used in the exemplary embodiment of the invention. The sensor 54 is a Dantec™ 55ROI and contains a 0.5 micrometer thick, 1.25 mm long nickel film deposited on a 3 mm long, 70 micrometer diameter quartz fiber. The sensor 54 possesses a rated sensitivity of 175 kHz over the velocity range of 0.2 m/s to 350 m/s. The Dantec™ 56COI (which is a constant temperature anemometer) includes a Wheatstone bridge and a servo amplifier (not shown).

In operation, when the sensor 54 is subjected to a fluid (air) flow, there is an instantaneous heat loss in the nickel film due to convective heat transfer. The heat loss causes a reduction in sensor temperature and therefore its resistance. The servo amplifier generates and outputs the voltage change required to restore the sensor to its original temperature. The signal, i.e., the voltage change, corresponds to the instantaneous air velocity passing the sensor and is nonlinear. In the preferred embodiment of the invention, a Dantec™ 56N21 linearizer is calibrated to generate a linear relationship between voltage and velocity. Thus, the velocity of the air flow past the sensor is obtained by the above described system. The bridge, servo amplifier and linearizer are part of the main anemometer unit, i.e., the Dantec™ 56COI.

In the preferred embodiment of the invention, each sensor probe must be individually calibrated in order to linearize its output response signal over the range of flow velocities expected to be encountered by the circumferential vents of the rotor 10. In one embodiment of the invention, the calibration is performed in a laboratory with ambient air at approximately 20° C. In one embodiment of the invention, five sensors are linearized over a velocity range of 0 to 100 meters/sec and calibrated so that 1 volt (produced by the amplifier) =10 meters/sec of flow velocity exiting a vent. Additionally, in another embodiment of the invention, 2 of the 5 probes are linearized over a range of 0 to 200 meters/sec, and calibrated so that 1 volt =20 meters/sec.

A preferred embodiment of the invention is presented by reference to FIGS. 6, 7, 8a and 8b. In this preferred embodiment of the invention, anemometer probes 50 are attached to positioning tables 60 (see FIG. 8) to provide the ability to remotely and automatically traverse the anemometer probes axially along the rotor during measurement of flow exiting circumferential vents of the rotor body. In the preferred embodiment of the invention, the positioning table 60 is an Exonic™ systems stepper-motor driven, single-axis positioning table. The table is used in conjunction with a remote motor drive unit with joystick controller and encoder with digital counter. This permits the probes to accurately traverse along the rotor body during running speed operation while an operator monitors the exact sensor location.

In the preferred embodiment of the invention, the total length of travel for the Exonic™ system is 24 inches (61 cm). In the preferred embodiment, it is necessary to reposition the traversing system several times to traverse the entire rotor. In the preferred embodiment, the anemometer sensor and probe 50 are mounted and secured to a positioning table 60. A one inch (2.54 cm) diameter machined micarta rod 52 is used to hold the probe. The rod 52 is clamped to a machined aluminum bracket which is bolted to the top surface of the table 60.

As shown in FIGS. 6, 7, 8a and 8b, the entire table and probe, sensor, and holder assembly are mounted in a vertical orientation to support stand assemblies 62, 64, one for each end of the rotor. The stands are heavy-duty steel "stiff-kneel" type gussets and include bracketed aluminum plates 62. In order to support the bracketed aluminum plates 62, the mounting faces of the supporting stands 64 are milled flat. These stands 62 are designed to be bolted down to a floor 66. In addition, neoprene sponge gaskets (not shown) are used between the bases of the support stands 64 and the floor 66 in order to minimize vibration. As shown in FIGS. 6, 7, 8a and 8b, the stands 64 are designed so that the positioning tables 60 bolt directly to the mounting faces of the aluminum plates 62 via through-holes. In addition, the mounting holes are slotted to allow the table 60 to be leveled accurately with respect to the rotor body 10.

Cables (not shown) necessary for the connection of instrumentation (probes and tables) are connected to the anemometer main unit and traversing control equipment (not shown). In the preferred embodiment of the invention, the length of cables between the anemometer main unit and the probe 54 are limited to 20 meters in order for the electronics to function correctly. In the preferred embodiment of the invention, the output of the anemometer main unit is connected to a Nicolet™ 410 signal-averaging storage oscilloscope (not shown) by a coaxial cable. The scope accepts a continuous analog response signal from the anemometer 50 in real-time, and digitizes and averages the signal over a designated number of scans, or "sweeps". The number of sweeps and time interval between sweeps are defined by the operator. The averaged digital signals are then stored to a floppy disk in ASCII format via a disk drive integral to the scope.

Tests were performed to determine the optimal position of the probe, the appropriate calibration of the probe, and the optimal number of sweeps to be averaged to yield a high quality signal. It has been found that the response is clearer and more consistent when the sensor is positioned close to the rotor body (the closer the better the response). As a consequence, in the preferred embodiment of the invention, it is prudent to place the sensor as close to the spinning rotor body as safety of the probe permits. In the preferred embodiment of the invention, this distance is approximately 0.100 inches (0.254 cm) (from 0.05 inches (0.13 cm) to 0.15 inches (0.38 cm)).

In the preferred embodiment of the invention, the sensors are calibrated to 100 m/s and 200 m/s. During tests, it was determined that sensors calibrated in the range of 0–50 m/s were occasionally subject to saturation. In particular, although the average velocity of flow was within this range, during testing it was noted that the anemometer signal occasionally became saturated indicating that the instantaneous velocity exceeded 50 m/s. If saturation occurs during testing, the average values stored in the scope will be distorted. Thus, in order to avoid saturation, the sensors used in the preferred embodiment of the invention are calibrated to 100 m/s and 200 m/s.

During initial testing, it was necessary to average approximately 20 sweeps before the signal became recognizable when the signal is sampled at 5 microsecond intervals. The quality of the signal increased with the number of sweeps averaged. Based on these tests, in the preferred embodiment of the invention, 500 sweep averages are used. As a consequence, in the preferred embodiment of the invention for a rotor shown in FIG. 1 spinning at 3600 RPM, the probe is placed as close as possible to the rotor, the calibration is set to 100 m/s and 200 m/s, the signal at 5 microsecond intervals and at least 500 sweeps per average are used.

Another consideration is the orientation of the probe to the rotation of the rotor 10, i.e., to the axis of rotation of the rotor, and the use of shields for the probe. At running speed (3600 RPM), the rotor surface and, therefore, the air adjacent to it, is travelling at a velocity of 628 ft/sec (192 m/s). This velocity is significantly greater than the velocity of the air exiting the circumferential vent holes. The velocity of air exiting the circumferential vent holes varies from about 150 ft/s to 60 ft/s (46 m/s to 18 m/s). Various shielding configurations were tested to determine whether they blocked the shear flow component. In addition, probe orientation was investigated to determine whether the orientation of the probe would remove the shear flow component.

In detail, when the probe is oriented parallel to the rotor body, the time response of the sensor is the greatest but the sensor is exposed to the full effects of the shear flow. When the probe is orientated perpendicular to the rotor body, the time response of the probe is slightly reduced but the sensor is relatively insensitive to the shear flow component. To determine the optimal probe configuration, the orientation of the sensor fiber with respect to the axis of the rotor was changed from perpendicular to parallel while the radial distance of the sensor from rotor body was varied between 0.11 and 0.511 inches (0.28 to 1.3 cm). The optimal configuration being when the sensor is placed 0.11 inches for the surface of the rotor body and perpendicular to the axis of rotation of the rotor body.

The testing also showed that the magnitude of the signal decreases rapidly when the sensor is moved away from the rotor body. For example, at 0.511 inches (1.3 cm) away from the rotor body, the individual vent flows are almost indistinguishable when the probe is in a perpendicular orientation; however, a defined pattern still exists with the probe in a parallel orientation. When the sensor is 0.11 inches (0.28 cm) from the rotor surface and oriented parallel to the rotor axis, the peak velocities at the vents are 120–110 m/s and the velocities along the pole region (no vents) are about 55 m/s. In the perpendicular orientation, the peak velocities at the vent exits are 55–60 m/sec while the velocities along the pole region are approximately 20 m/sec. The differences between the velocities in the vented region are due to the absence of the shear velocity component present when the probe is in the parallel orientation.

Nevertheless, as noted above, the measured velocity in the pole region with the sensor perpendicular to the rotor axis is still not zero. This is due primarily to the fact that the hot film anemometer is insensitive to the direction of flow. For example, when the mean velocity along the surface is zero, there are still turbulent fluctuations which are characterized by random positive and negative flows. Since the anemometer measures only the magnitude of velocity of flow and not its direction, the positive and negative flows do not cancel and thus the sensor detects or determines the average or RMS turbulence level on the surface of the rotor body.

The testing also showed that velocities measured by the sensor at the pole regions (not vents) are relatively insensitive to the sensor's distance from the rotor body when the sensor has an orientation perpendicular to the rotor axis. The velocities measured by the sensor at the pole regions, however, drops off steadily with the sensor's increased distance from the rotor body when the sensor has an orientation parallel to the rotor axis. This data further indicated that the velocity measured by the sensor in the pole region is primarily the RMS turbulence level when the sensor has an orientation perpendicular to the rotor axis, whereas, the velocity measured by the sensor in the pole region is the shear velocity when the sensor has an orientation parallel to the rotor axis.

Figure 9:
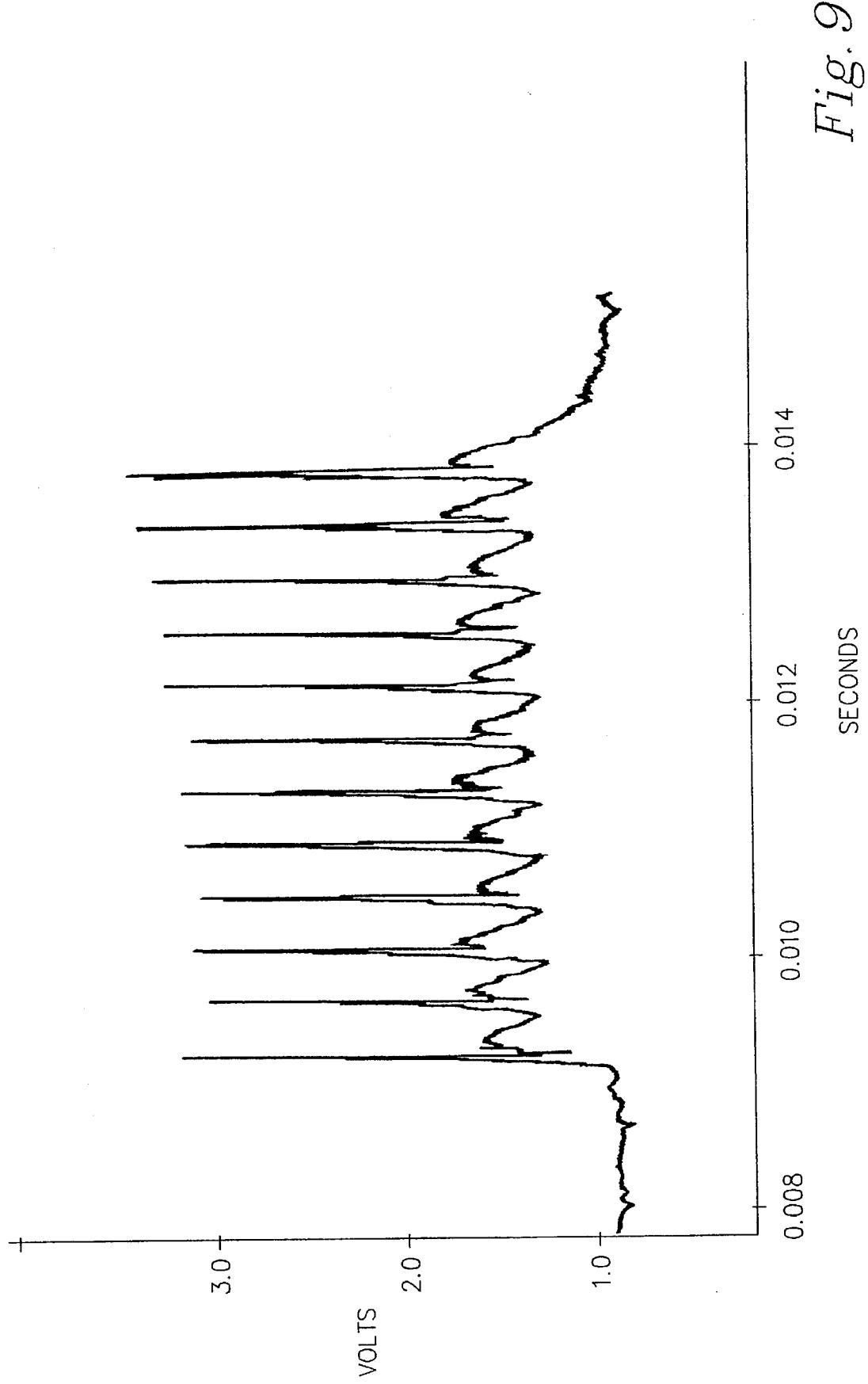
FIG. 9 depicts flow velocity of a set of 12 circumferential flow vents of a rotor similar to the rotor shown in FIG. 6 measured by the present invention.

In view of the above observations, in the preferred embodiment of the invention, the most meaningful and accurate signal is obtained when the sensor is approximately 0.100 inches (0.254 cm) away from the rotor surface and the fiber of the sensor has an orientation perpendicular to the rotor axis. FIG. 9 illustrates flow velocity measurements taken with the sensor in this preferred position for circumferential vent hole number 15 of the rotor 9. As shown in FIG. 10, each of the 12 circumferential vent holes for a pole of the rotor 10 is characterized by a sharp peak followed by a much smaller peak. The sharp peak corresponds to the flow exiting the vent hole (15) and the small peak corresponds to the RMS turbulence.

Tests of the probe with various shields were also performed and indicated that the probe operated satisfactorily without a shield. All of the shielding tests were performed with the probe oriented perpendicular to the rotor axis. Due to the orientation of the probe, these tests only evaluated the effect of the shield on the base anemometer signal. The first shield tested had a semi-circular shape which was integral to the micarta rod probe holder. During this test, the holder was simply slid up on the probe so that the upstream side of the sensor was shielded. The test showed that with the first shield in place, the baseline turbulence along the pole region increased from 18 m/s to 23 m/s. Overall, the effect of the first shield on the anemometer signal was small.

A second shield was also tested. The second shield had a U-shaped, "shoehorn" style configuration. The geometry or shape of this shield was designed to block any axially entrained flow in addition to the shear flow. The second shield significantly affected the surrounding flow. In particular, the baseline turbulence increased to about 26 m/s and the characteristic signals from the circumferential vents were significantly altered. The tests indicated that the second shield was unacceptable because it greatly distorted the flow. As a consequence, in the preferred embodiment of the invention, the probe is not shielded.

Although the invention has been described in terms of a preferred embodiment, the spirit and scope of the appended claims are unlimited by any details not expressly stated in the claims. For example, further tests may be performed to determine whether the first shield, i.e., the semi-circle, or other similarly configured shields, may aid in the measurement of flow from vents in a spinning rotor.

What is claimed is:

1. An apparatus for measuring a velocity of flow exiting a circumferential vent of an air-cooled rotor running at operating speed, the vent forming a circumferential path about an axis of rotation of the rotor, the apparatus comprising:

a high frequency response anemometer having a sensor which generates a signal that is representative of the flow velocity of the vent;

a support structure which orients the sensor perpendicular to the axis of rotation of the rotor and holds the sensor of the anemometer close to the circumferential path formed by the vent about the axis of rotation of the rotor; and means for determining the flow velocity of the vent of the rotor from the signal generated by the sensor.

2. An apparatus according to claim 1, wherein the means for determining comprises an amplifier.

3. An apparatus according to claim 1, wherein the support structure positions the sensor approximately 0.05 inches (0.13 cm) to 0.15 inches (0.38 cm) from the circumferential path formed by the vent about the axis of rotation of the rotor.

4. An apparatus according to claim 2, wherein the support structure includes a traversing table where the anemometer is mounted to the traversing table.

5. An apparatus according to claim 4, where the support structure further includes a brace and a mount where the mount connects the traversing table to the brace and the brace connects the mount to a solid structure.

6. An apparatus according to claim 1, where the anemometer is a hot-film anemometer.

7. An apparatus according to claim 6, where the hot-film anemometer includes a nickel film deposited on a quartz fiber.

8. An apparatus for measuring a velocity of flow exiting a plurality of circumferential vents of an air-cooled rotor running at operating speed, the plurality of vents forming a circumferential path about an axis of rotation of the rotor, the apparatus comprising:

a high frequency response anemometer having a sensor which generates a signal that is representative of the flow velocity of the plurality of vents;

a support structure which orients the sensor perpendicular to the axis of rotation of the rotor and holds the sensor of the anemometer close to the circumferential path formed by the plurality of vents about the axis of rotation of the rotor; and means for determining the flow velocity of the plurality of vents of the rotor from the signal generated by the sensor.

9. An apparatus according to claim 8, wherein the support structure positions the sensor approximately 0.05 inches (0.13 cm) to 0.15 inches (0.38 cm) from the circumferential path formed by the vent about the axis of rotation of the rotor.

10. An apparatus for measuring a velocity of flow exiting a first and a second circumferential vent of an air-cooled rotor running at operating speed, the first circumferential vent forming a first circumferential path about an axis of rotation of the rotor and the second circumferential vent forming a second circumferential path about an axis of rotation of the rotor, the apparatus comprising:

a high frequency response anemometer having a sensor which generates a signal that is representative of the flow velocity of vents;

a support structure including a traversing table, where the structure is capable of alternatively positioning the sensor of the anemometer close to the first circumferential path formed by the first circumferential vent about the axis of rotation of the rotor and close to the second circumferential path formed by the second circumferential vent about the axis of rotation of the rotor; and means for determining the flow velocity of the first circumferential vent of the rotor from the signal generated by the sensor when the support structure positions the sensor close to the first circumferential path formed by the first circumferential vent about the axis of rotation of the rotor and for determining the flow velocity of the second circumferential vent of the rotor from the signal generated by the sensor when the support structure positions the sensor close to the second circumferential path formed by the second circumferential vent about the axis of rotation of the rotor.

11. An apparatus according to claim 10, wherein the support structure orients the sensor perpendicular to the axis of rotation of the rotor and positions the sensor approximately 0.05 inches (0.13 cm) to 0.15 inches (0.38 cm) from the first circumferential path formed by the first vent about the axis of rotation of the rotor when the support structure positions the sensor close to the first circumferential path and positions the sensor approximately 0.05 inches (0.13 cm) to 0.15 inches (0.38 cm) from the second circumferential path formed by the second vent about the axis of rotation of the rotor when the support structure positions the sensor close to the second circumferential path.

12. An apparatus for measuring a velocity of flow exiting a first plurality and a second plurality of circumferential vents of an air-cooled rotor running at operating speed, the first plurality of circumferential vents forming a first circumferential path about an axis of rotation of the rotor and the second plurality of circumferential vents forming a second circumferential path about an axis of rotation of the rotor, the apparatus comprising:

a high frequency response anemometer having a sensor which generates a signal that is representative of the flow velocity of vents;

a support structure including a traversing table, where the structure is capable of alternatively positioning the sensor of the anemometer close to the first circumferential path formed by the first plurality of circumferential vents about the axis of rotation of the rotor and close to the second circumferential path formed by the second plurality of circumferential vents about the axis of rotation of the rotor; and means for determining the flow velocity of the first plurality of circumferential vents of the rotor from the signal generated by the sensor when the support structure positions the sensor close to the first circumferential path formed by the first plurality of circumferential vents about the axis of rotation of the rotor and for determining the flow velocity of the second plurality of circumferential vents of the rotor from the signal generated by the sensor when the support structure positions the sensor close to the second circumferential path formed by the second plurality of circumferential vents about the axis of rotation of the rotor.

13. An apparatus according to claim 12, wherein the support structure orients the sensor perpendicular to the axis of rotation of the rotor and positions the sensor approximately 0.05 inches (0.13 cm) to 0.15 inches (0.38 cm) from the first circumferential path formed by the first plurality of circumferential vents about the axis of rotation of the rotor when the support structure positions the sensor close to the first circumferential path and positions the sensor approximately 0.05 inches (0.13 cm) to 0.15 inches (0.38 cm) from the second circumferential path formed by the second plurality of circumferential vents about the axis of rotation of the rotor when the support structure positions the sensor close to the second circumferential path.

14. A method for measuring a velocity of flow exiting a circumferential vent of an air-cooled rotor running at operating speed, the vent forming a circumferential path about an axis of rotation of the rotor, the method comprising the steps of:

a) employing a high frequency response anemometer having a sensor to generate a signal that is representative of the flow velocity of the vent;

b) holding the sensor of the anemometer close to the circumferential path formed by the vent about the axis of rotation of the rotor;

c) orienting the sensor perpendicular to the axis of rotation of the rotor; and d) determining the flow velocity of the vent of the rotor from the signal generated by the sensor.

15. A method according to claim 14, wherein step b) includes the step of positioning the sensor approximately 0.05 inches (0.13 cm) to 0.15 inches (0.38 cm) from the circumferential path formed by the vent about the axis of rotation of the rotor.

16. A method according to claim 15, wherein step c) includes the step of sampling the signal generated by the anemometer for the vent at least 20 times prior to determining the flow velocity for the vent.

17. A method according to claim 15, wherein step c) includes the step of sampling the signal generated by the anemometer for the vent about 500 times prior to determining the flow velocity for the vent.

18. A method according to claim 17, wherein the anemometer employed in step a) is a hot-film anemometer.

19. A method according to claim 18, wherein the hot-film anemometer includes a nickel film deposited on a quartz fiber.

20. A method for measuring a velocity of flow exiting a plurality of circumferential vents of an air-cooled rotor running at operating speed, the plurality of vents forming a circumferential path about an axis of rotation of the rotor, the method comprising the steps of:

a) employing a high frequency response anemometer having a sensor to generate a signal that is representative of the flow velocity of the plurality of vents;

b) holding the sensor of the anemometer close to the circumferential path formed by the plurality of vents about the axis of rotation of the rotor; and c) determining the flow velocity of the plurality of vents of the rotor from the signal generated by the sensor.

21. A method according to claim 20, wherein step b) includes the steps of:

orienting the sensor perpendicular to the axis of rotation of the rotor; and positioning the sensor approximately 0.05 inches (0.13 cm) to 0.15 inches (0.38 cm) from the circumferential path formed by the vent about the axis of rotation of the rotor.

22. A method for measuring a velocity of flow exiting a first and a second circumferential vent of an air-cooled rotor running at operating speed, the first circumferential vent forming a first circumferential path about an axis of rotation of the rotor and the second circumferential vent forming a second circumferential path about an axis of rotation of the rotor, the method comprising the steps of:

a) employing a high frequency response anemometer having a sensor to generate a signal that is representative of the flow velocity of vents;

b) employing a support structure including a traversing table to alternatively position the sensor of the anemometer close to the first circumferential path formed by the first circumferential vent about the axis of rotation of the rotor and close to the second circumferential path formed by the second circumferential vent about the axis of rotation of the rotor; and c) determining the flow velocity of the first circumferential vent of the rotor from the signal generated by the sensor when the support structure positions the sensor close to the first circumferential path formed by the first circumferential vent about the axis of rotation of the rotor and determining the flow velocity of the second circumferential vent of the rotor from the signal generated by the sensor when the support structure positions the sensor close to the second circumferential path formed by the second circumferential vent about the axis of rotation of the rotor.

23. A method according to claim 22, wherein step b) includes the steps of:

orienting the sensor perpendicular to the axis of rotation of the rotor; and positioning the sensor approximately 0.05 inches (0.13 cm) to 0.15 inches (0.38 cm) from the first circumferential path formed by the first vent about the axis of rotation of the rotor when the support structure positions the sensor close to the first circumferential path and positioning the sensor approximately 0.05 inches (0.13 cm) to 0.15 inches (0.38 cm) from the second circumferential path formed by the second vent about the axis of rotation of the rotor when the support structure positions the sensor close to the second circumferential path.

24. A method for measuring a velocity of flow exiting a first and a second plurality of circumferential vents of an air-cooled rotor running at operating speed, the first plurality of circumferential vents forming a first circumferential path about an axis of rotation of the rotor and the second plurality of circumferential vents forming a second circumferential path about an axis of rotation of the rotor, the method comprising the steps of:

a) employing a high frequency response anemometer having a sensor to generate a signal that is representative of the flow velocity of vents;

b) employing a support structure including a traversing table to alternatively position the sensor of the anemometer close to the first circumferential path formed by the first plurality of circumferential vents about the axis of rotation of the rotor and close to the second circumferential path formed by the second plurality of circumferential vents about the axis of rotation of the rotor; and c) determining the flow velocity of the first plurality of circumferential vents of the rotor from the signal generated by the sensor when the support structure positions the sensor close to the first circumferential path formed by the first plurality of circumferential vents about the axis of rotation of the rotor and determining the flow velocity of the second plurality of circumferential vents of the rotor from the signal generated by the sensor when the support structure positions the sensor close to the second circumferential path formed by the second plurality of circumferential vents about the axis of rotation of the rotor.

25. A method according to claim 24, wherein step b) includes the steps of:

orienting the sensor perpendicular to the axis of rotation of the rotor; and positioning the sensor approximately 0.05 inches (0.13 cm) to 0.15 inches (0.38 cm) from the first circumferential path formed by the first plurality of circumferential vents about the axis of rotation of the rotor when the support structure positions the sensor close to the first circumferential path and positioning the sensor approximately 0.05 inches (0.13 cm) to 0.15 inches (0.38 cm) from the second circumferential path formed by the second plurality of circumferential vents about the axis of rotation of the rotor when the support structure positions the sensor close to the second circumferential path.

* * * * *